United States Patent
Confer et al.

(10) Patent No.: US 9,042,826 B2
(45) Date of Patent: May 26, 2015

(54) APPARATUS AND METHOD FOR POWER STATE TRANSITION VIA NEAR FIELD COMMUNICATION

(71) Applicant: Samsung Electronics Co. Ltd., Suwon-si, Gyeonggi-do (KR)

(72) Inventors: William James Confer, Clinton, NY (US); Luke Russell Harvey, Edgerton, KS (US)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 13/660,345

(22) Filed: Oct. 25, 2012

(65) Prior Publication Data

US 2014/0120832 A1   May 1, 2014

(51) Int. Cl.
  *H04B 5/00*   (2006.01)
  *H04B 7/00*   (2006.01)
  *H04M 1/725*   (2006.01)
  *H04W 52/02*   (2009.01)

(52) U.S. Cl.
  CPC ............ *H04B 5/0031* (2013.01); *H04B 5/0037* (2013.01); *H04M 1/7253* (2013.01); *H04W 52/0251* (2013.01)

(58) Field of Classification Search
  CPC . H04L 63/0492; H04L 63/0853; H04L 63/18; H04B 5/0012; H04B 5/0037; H04B 5/0062; H04M 1/7253; H04M 2250/04; H04M 1/72577; H04W 12/06; G06K 7/10237
  USPC ...................... 455/41.1, 41.2, 41.3, 410, 411; 340/10.1; 726/20
  See application file for complete search history.

(56) References Cited

U.S. PATENT DOCUMENTS

| | | | |
|---|---|---|---|
| 7,912,441 B2 | 3/2011 | Von Bosch | |
| 8,254,835 B2 * | 8/2012 | Lee | 455/41.1 |
| 2003/0006905 A1 | 1/2003 | Shieh et al. | |
| 2007/0188328 A1 * | 8/2007 | Mochizuki et al. | 340/572.7 |
| 2010/0081374 A1 | 4/2010 | Moosavi et al. | |
| 2010/0082481 A1 * | 4/2010 | Lin et al. | 705/41 |
| 2010/0082489 A1 * | 4/2010 | Lin et al. | 705/59 |
| 2010/0190437 A1 * | 7/2010 | Buhot | 455/41.1 |
| 2010/0248710 A1 | 9/2010 | Sklovsky et al. | |
| 2011/0050164 A1 * | 3/2011 | Partovi et al. | 320/108 |
| 2011/0313922 A1 * | 12/2011 | Ben Ayed | 705/42 |
| 2013/0109306 A1 * | 5/2013 | Savoj | 455/41.1 |
| 2013/0259232 A1 * | 10/2013 | Petel | 380/270 |
| 2013/0332756 A1 * | 12/2013 | Kim et al. | 713/320 |

* cited by examiner

*Primary Examiner* — Lewis West
(74) *Attorney, Agent, or Firm* — Jefferson IP Law, LLP

(57) ABSTRACT

An apparatus and method for power state transition via Near Field Communication (NFC) are provided. The apparatus includes a Near Field Communication (NFC) transceiver for generating a trigger signal in response to presence of another NFC device within an NFC communication range of the NFC transceiver, and a controller for controlling the apparatus to transition to or from a wake state when the trigger signal is received from the NFC transceiver.

17 Claims, 4 Drawing Sheets

APPARATUS AND METHOD FOR POWER STATE TRANSITION VIA NEAR FIELD COMMUNICATION

BACKGROUND OF THE INVENTION

1. Field of the Invention

The present invention relates to an apparatus and method for interaction among devices supporting Near Field Communication (NFC). More particularly, the present invention relates to an apparatus and method for power state transitions via NFC.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

In a similar vein, features previously associated only with computers have expanded to other devices. For example, televisions and set-top boxes (including video game consoles, cable boxes, and the like) now offer a variety of features beyond their original functionality, including streaming content and Internet access (e.g., web browsing). In addition, tablets, such as the Apple™ iPad™ and Samsung™ Galaxy Tab™, have exploded in popularity in recent years.

Near Field Communication (NFC) is one technology now being included and featured in these devices. NFC supports very short range communication (typically 4 centimeters or less) between devices. NFC supports both active communication, in which both devices are powered, and passive communication, in which one device draws power from the electromagnetic field generated by the other device.

Devices incorporating NFC functionality typically must be in an awakened state before the NFC functionality may be used. This typically requires the user to perform some physical action, such as touching the screen or pressing a button. According to the related art, the NFC circuit is part of a System on Chip (SoC) or an integrated circuit, such that the NFC circuit is only active while power is supplied to the whole chip.

In some systems according to the related art, certain applications may be executed by a mobile device even while the device is in a powered off or sleep state. However, these systems still require the user to perform physical operations on the mobile device to select an application.

Bluetooth technology has also been suggested as a technique for controlling a power on/off or sleep/wake of a device. However, Bluetooth requires a constant power supply and consumes much more power than NFC. In order to use Bluetooth to control power on/off or sleep/wake, the Bluetooth circuit must be supplied with sufficient power while the device is powered off or in the sleep state. Accordingly, there is a need for enhancing power state transitions in mobile devices while reducing power consumption in a mobile terminal.

SUMMARY OF THE INVENTION

Aspects of the present invention are to address at least the above-mentioned problems and/or disadvantages and to provide at least the advantages described below. Accordingly, an aspect of the present invention is to provide an apparatus and method for power state transition using Near Field Communication (NFC).

In accordance with an aspect of the present invention, an apparatus is provided. The apparatus includes a Near Field Communication (NFC) transceiver for generating a trigger signal in response to presence of another NFC device within an NFC communication range of the NFC transceiver, and a controller for controlling the apparatus to transition to or from a wake state when the trigger signal is received from the NFC transceiver.

In accordance with another aspect of the present invention, a method for power state transition in an apparatus supporting Near Field Communication (NFC) is provided. The apparatus includes determining that another NFC device has entered within an NFC communication range of the apparatus, generating a trigger signal in response when the other NFC device enters into communication range of the apparatus, and controlling a power state transition to a wake state or to a sleep state according to the trigger signal.

In accordance with another aspect of the present invention, an apparatus is provided. The apparatus includes a Near Field Communication (NFC) transceiver for generating a trigger signal in response to presence of another NFC device within an NFC communication range of the NFC transceiver, a Power Management Integrated Circuit (PMIC) for receiving the trigger signal and for generating an interrupt signal for transitioning to or from a wake state, and a controller for transitioning the apparatus to or from the wake state according to the interrupt generated by the PMIC.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for a power transition, such as from a sleep state to a wake station, using Near Field Communication (NFC). While a mobile device and a television are described below, exemplary embodiments of the present invention may be incorporated into a variety of devices, including tablets, desktop and laptop computers, set-top boxes, and other appliances.

Figure 1:
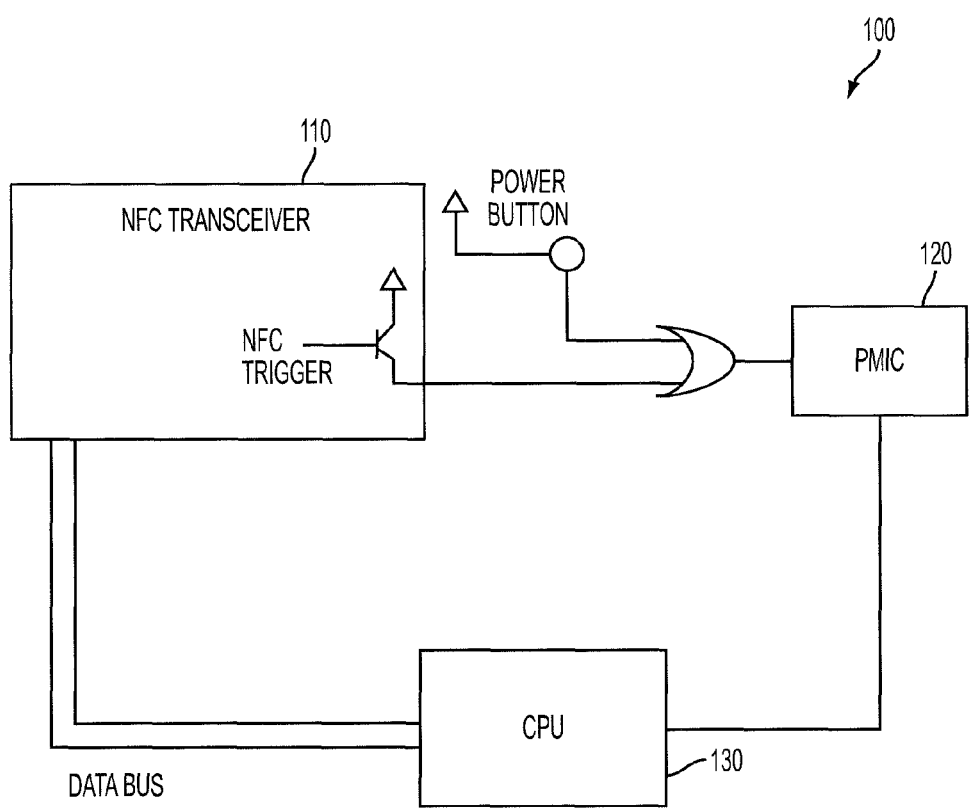
FIG. 1 shows an apparatus supporting power transition via Near Field Communication (NFC) according to an exemplary embodiment of the present invention.

FIG. 1 shows an apparatus supporting power transition via Near Field Communication (NFC) according to an exemplary embodiment of the present invention.

Referring to FIG. 1, the apparatus 100 includes an NFC transceiver 110, a controller 120, and a Power Management Integrated Circuit (PMIC) 130. According to another exemplary embodiment, the PMIC 130 may be omitted, and its functionality performed by the controller 120 as described below. Similarly, the PMIC 130 may be replaced by another power management peripheral.

The apparatus 100 may also include additional units not shown here in order to focus upon aspects of the present invention. These additional units may vary according to the function and design of the mobile device, and may include a display unit, input unit, camera, location unit (such as a Global Positioning System unit), and the like. Similarly, although not shown in FIG. 1, the mobile device 100 may also include a storage unit to store applications, data, and the like.

The NFC transceiver 110 communicates with other devices via NFC. The NFC transceiver 110 may be integrated with the controller 120 or provided separately. The NFC transceiver 110 may employ passive or active operation.

In passive operation, the NFC transceiver 110 does not receive power. Instead, the NFC transceiver 110 draws power from an electromagnetic field generated by another NFC device in close proximity to the apparatus 100. When another NFC device (such as a mobile device), the electromagnetic field generated by the other device's NFC transceiver generates a small current or voltage change. This current or voltage change may trigger a transistor state change signal within the NFC transceiver 110. This signal would then be input to the PMIC 130 or controller 120 as described below. In this situation, no actual data would be transmitted between the two devices; instead, the mere proximity of the other NFC device would be sufficient to generate an interrupt to transition the apparatus to the wake state.

According to another exemplary embodiment of the present invention, the NFC transceiver 110 operating in passive mode may receive an additional supplemental power supply upon activation. This additional power supply may come from the main power supply or from a supplementary power supply. The additional power could be used for additional session management or other operations during the transition to the wake state. For example, the supplemental power could be used to enable the apparatus 100 to communicate and exchange data with the other NFC device.

The information transmitted during the communication may be authentication information to ensure that the user of the other device is authorized to access the apparatus 100. In this case, the apparatus 100 may directly transition to the wake state, without displaying a locking screen or requiring input of authentication information (such as a password).

In the passive mode, the NFC transceiver 110 would not need to receive power from an external source. However, the other NFC device would need to operate in an active mode in order to supply the power to the NFC transceiver 110. In this case, the other NFC device could be, for example, a mobile device (such as a phone, tablet, or the like).

In contrast, if the NFC transceiver 110 is operating in active mode, the NFC transceiver 110 receives power from a power source of the apparatus 100. The power source may be the main power source of the apparatus 100 or a supplementary power source of the apparatus 100. The NFC transceiver 110 would other operate in a similar fashion as in the passive mode. However, because the NFC transceiver 110 receives its own power, the other NFC could operate in the passive mode. In this case, the other NFC device could be a keyfob, smart card, or other object capable of incorporating an NFC transceiver 110 in addition to the powered devices mentioned above.

In the active mode, when another NFC device enters into communication range of the NFC transceiver 110, the NFC transceiver 110 may receive a signal from the other NFC device. In the passive mode, the current generated by the other NFC device may drive a transistor state change. In response to the signal from the other NFC device or the transistor state change, the NFC transceiver 110 generates a trigger signal, which is input to the PMIC 130 or controller 120 in a similar fashion as the completion of a circuit by pressing a power button results in a signal being input to the PMIC 130 or controller 120.

The PMIC 130 manages power for the apparatus 100. For example, the PMIC 130 may control battery management, voltage regulation, charging, and other functions relating to power management. When the apparatus 100 is in a sleep state (or a power off state), the PMIC 130 may also receive an interrupt from the NFC transceiver 110 when another NFC device interacts with the NFC transceiver 110. In response to receiving the interrupt, the PMIC 130 controls the transition from the sleep state (or power off state) to the wake state (or power on state), in conjunction with the controller 120.

The controller 120 controls overall operation of the apparatus 100. When the PMIC 130 receives the interrupt from the NFC transceiver 110, the PMIC 130 communicates with the controller 120 to transition the apparatus 100 to the wake state (or power on state).

In addition, the controller 120 may receive additional information from the other NFC device via the NFC transceiver 110. For example, the controller 120 may receive application information regarding an application executing on the other NFC device. The controller 120 may then control the apparatus 100 to, for example, execute the same (or similar) application on the apparatus 100. An example of this operation is described below with respect to FIGS. 3A-3D.

Figure 2:
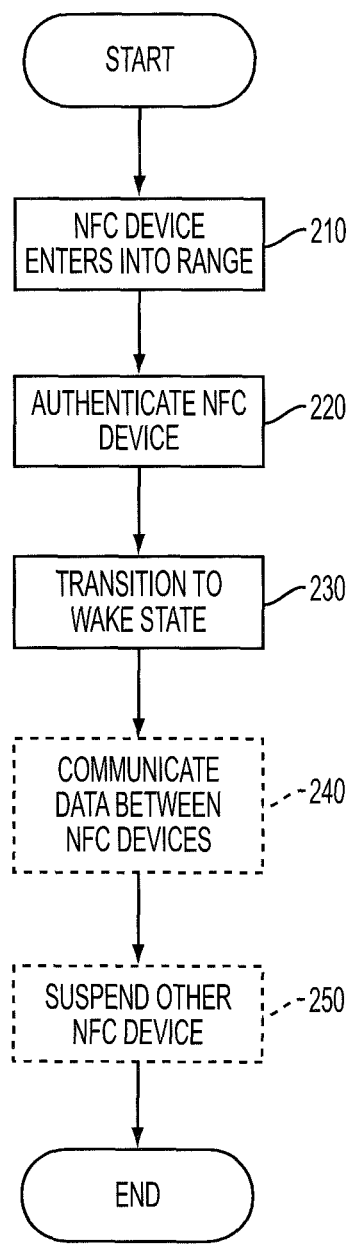
FIG. 2 shows a method of transitioning to a wake state in an apparatus using NFC according to exemplary embodiments of the present invention.

FIG. 2 shows a method of transitioning to a wake state in an apparatus using NFC according to exemplary embodiments of the present invention.

Referring to FIG. 2, the other NFC device enters into range of the apparatus 100 in step 210, and NFC communication is initiated. If the apparatus 100 is operating in passive mode, the electromagnetic field generated by the other NFC device induces a current or voltage in the NFC transceiver 110. If the apparatus 100 is operating in active mode, the NFC transceiver 110 may determine that the other NFC device is within range by receiving a data transmission from the other NFC device. According to another exemplary embodiment of the present invention, the NFC transceiver 110 operating in passive mode may receive supplemental power when the other NFC device enters into range.

If the other NFC device is an active NFC device (such as a mobile device), the other NFC device may display a dialog or other request to confirm whether the user would like to transition the apparatus to the wake (or power on) state.

In step 220, the other NFC device is authenticated. The other NFC device may transmit authentication information to the apparatus 100 via the NFC transceiver 110. The apparatus 100 may execute an application or other verification operation to verify the received authentication information.

Once the authentication information is verified, the controller 120 (or PMIC 130) begins the transition to the wake state in step 230. In this case, a separate lock screen or password entry screen may be bypassed. Alternatively, the transition may include displaying the locking screen or password entry screen for additional security.

Although not shown in FIG. 2, if the authentication information is not valid, the apparatus 100 may remain in the sleep (or power off) state. Alternatively, the apparatus 100 may display the locking or password entry screen to allow the user to enter a password or other authentication information. Similarly, according to another exemplary embodiment of the present invention, the authentication step may be omitted. In this case, the locking screen or password entry screen may be displayed to allow the user to enter authentication information. Although somewhat less secure, the apparatus could nevertheless also transition directly to the wake state without requiring authentication.

In step 240, additional data may be communicated between the apparatus 100 and the other NFC device. For example, application data may be transmitted to allow the user to resume operating a particular application on the apparatus 100. An example of this is given below with respect to FIGS. 3A-3D. As indicated by the dotted lines in FIG. 2, step 240 may be omitted.

In step 250, the other NFC device suspends operation or transitions to a sleep (power off) state. Alternatively, an application executing on the other NFC device may be terminated, and the other NFC device may remain in the wake state. As with step 240, this operation may be omitted, and the other NFC device may remain in its previous state. The subsequent operation of the other NFC device may be controlled according to a signal transmitted from the NFC transceiver 110, and may be selected according to a user setting. The signal may request the other NFC device to remain in a current state (omitting step 240), transition to a sleep state (step 240), or another operation (such as terminating an executing application, as described below with respect to FIGS. 3A-3D).

FIGS. 3A-3D illustrate an example of using an NFC device to transition to a wake state according to an exemplary embodiment of the present invention.

Figure 3A:
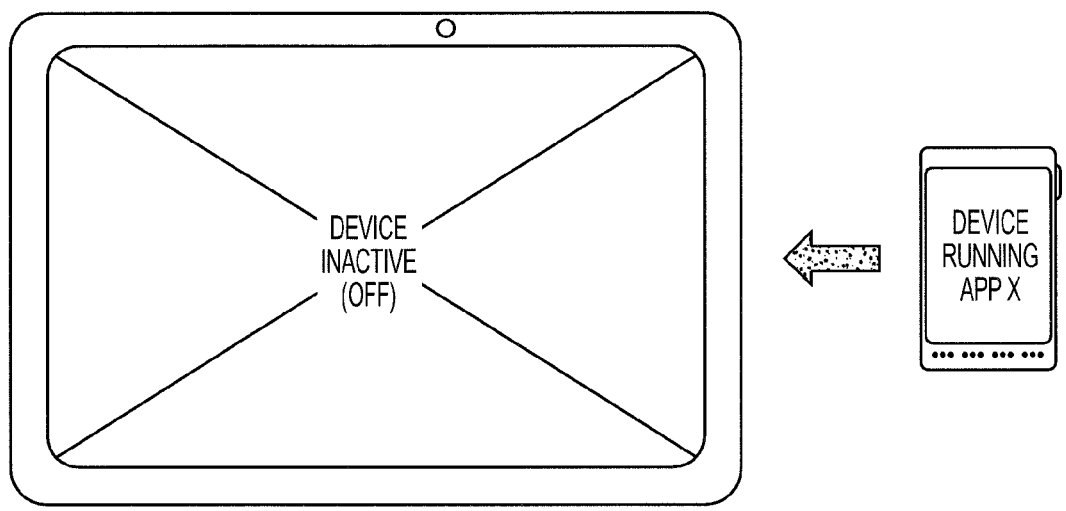
FIGS. 3A-3D illustrate an example of using an NFC device to transition to a wake state according to an exemplary embodiment of the present invention.

Referring to FIGS. 3A-3D, the user is viewing a video using Application X on a mobile device, as seen in FIG. 3A. A variety of applications are available for viewing streaming video, and many of these applications support video on multiple devices, so a particular application is not described here. Similarly, while the application described with respect to this example is a video application, exemplary embodiments of the present invention may also be applied to other types of applications, including music players, document editors, web browsers, games, and the like.

Figure 3B:
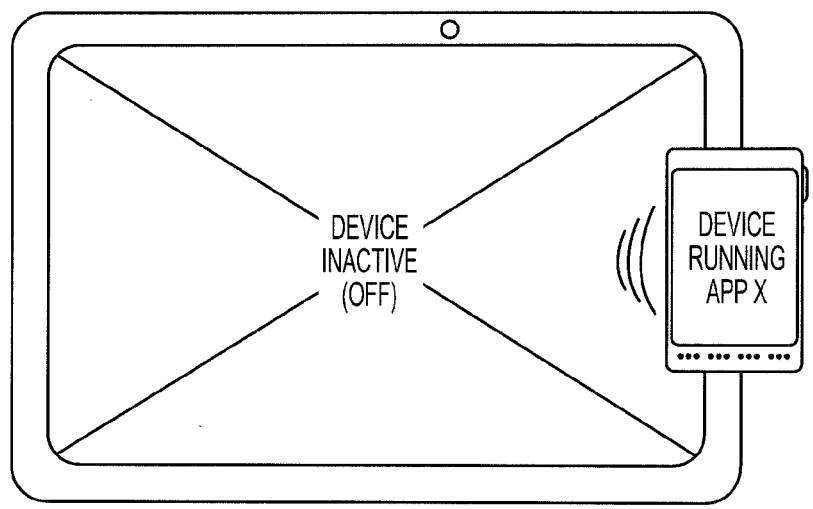

At some point, the user decides to view the video on another device, such as a 'smart' television. The user brings the mobile device within NFC range of the smart television, as shown in FIG. 3A. Then, as shown in FIG. 3B, the mobile device initiates NFC communication with the smart television. This may be performed via steps 210-230 of FIG. 2. At this point, video reproduction on the mobile device may be automatically paused. Alternatively, the user may have paused video reproduction prior to the initiation of NFC communication.

Figure 3C:
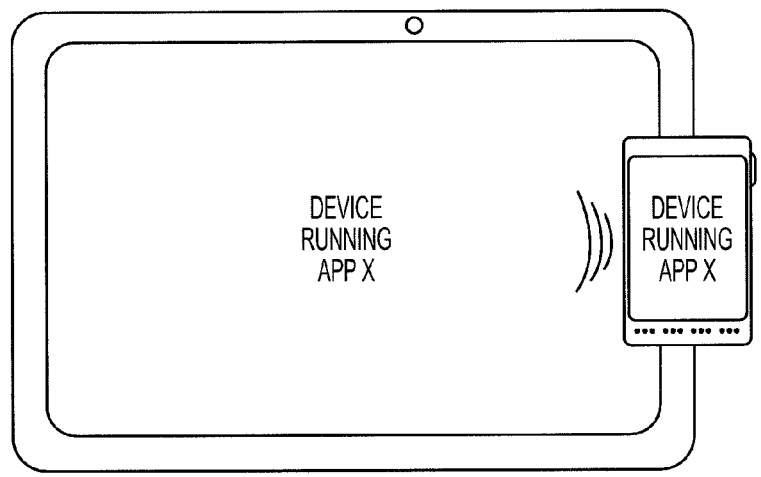

Once the smart television has transitioned to the wake state, the two devices communicate with each other as shown in FIG. 3C. The data communicated may include the name of Application X, identification information of the video being watched on the mobile device, the point where reproduction of the video has paused, and other information the smart television may need to begin reproduction of the video. Using this information, the smart television may begin reproduction of the video from the point where the video left off.

Figure 3D:
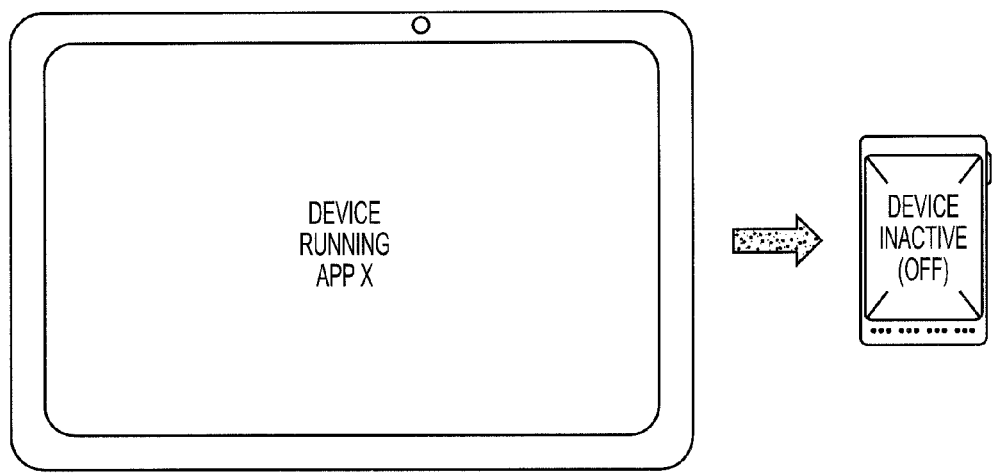

In FIG. 3D, the smart television has begun reproduction of the video. With the transition complete, the mobile device transitions to a sleep state. Alternatively, the mobile device may remain in a wake state but quit the application being used to reproduce the video. From the perspective of the user, the video has moved seamlessly from the mobile device to the smart television.

Although exemplary embodiments of the present invention have been described above as using NFC communications to transition from a sleep state to a wake state, NFC communication may also be used to transition from a wake state to a sleep state. In the example given in FIGS. 3A-3D, the smart television according to an exemplary embodiment of the invention used NFC communication with the mobile device to transition from the sleep state to the wake state. The mobile device, however, could be seen as using NFC communication to transition from the wake state to the sleep state.

Continuing with the example of FIGS. 3A-3D, the user may at some point wish to continue watching the video in another room. The user could bring the sleeping mobile device within NFC range of the smart television, at which point the smart television would transition to the sleep state, and the mobile device would transition to the wake state and continue reproducing the video. The user may then take the mobile device to the television in the other room, where a process similar to the example shown in FIGS. 3A-3D would result in the television in the other room waking and reproducing the video.

According to exemplary embodiments of the present invention, an apparatus supporting NFC communication may use NFC communication with another device to transition from a sleep state to a wake state. This requires less power than other solutions and does not require the user to physically interact with the apparatus.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
a Near Field Communication (NFC) transceiver configured to generate a trigger signal in response to presence of another NFC device within an NFC communication range of the NFC transceiver and to receive application data from the other NFC device; and
a controller configured to control the apparatus to transition to or from a wake state when the trigger signal is received from the NFC transceiver and to control the apparatus to execute an application according to the application information received from the other NFC device,
wherein, when the application data is received from the other NFC device, the controller controls the NFC transceiver to transmit, to the other NFC device, a request for the other NFC device to stop executing a corresponding application.

2. The apparatus of claim 1, further comprising:
a power supply for supplying power to the NFC transceiver while the apparatus is operating in a sleep state;
wherein the NFC transceiver operates in an active mode.

3. The apparatus of claim 1, wherein the NFC transceiver operates in a passive mode without requiring a power supply.

4. The apparatus of claim 3, wherein, when the NFC transceiver operating in passive mode receives data from the other NFC device, the apparatus is controlled such that supplemental power is provided to the NFC transceiver.

5. The apparatus of claim 1, wherein the NFC transceiver receives authentication data from the other NFC device, and
wherein the controller authenticates the other NFC device using the authentication data, and controls the apparatus to transition to or from the wake state without displaying a locking screen or requesting additional input of authentication data from a user.

6. The apparatus of claim 1, wherein the application is a video application, and wherein the controller controls the apparatus to reproduce the video according to the application data received from the other NFC device.

7. The apparatus of claim 1, wherein, after the apparatus transitions to the wake state, the controller controls the NFC transceiver to transmit, to the other NFC device, a signal for controlling an operation of the other NFC device.

8. The apparatus of claim 7, wherein the signal for controlling the other NFC device is a signal requesting the other NFC device to transition to a sleep state.

9. The apparatus of claim 2, wherein the wake state is a state in which power is supplied to the apparatus, and
wherein the sleep state is a state in which power is not supplied to the apparatus.

10. A method for power state transition in an apparatus supporting Near Field Communication (NFC), the apparatus comprising:
determining that another NFC device has entered within an NFC communication range of the apparatus;
generating a trigger signal in response when the other NFC device enters into communication range of the apparatus;
controlling a power state transition to a wake state or to a sleep state according to the trigger signal;
receiving application data from the other NFC device;
after transitioning to the wake state, executing an application on the apparatus according to the application data; and
after receiving the application data, transmitting a request, to the other NFC device, to terminate execution of a corresponding application.

11. The method of claim 10, further comprising:
generating the trigger signal in response to a signal received from the other NFC device.

12. The method of claim 10, further comprising:
receiving authentication data from the other NFC device; and
determining a validity of the authentication data,
wherein the controlling of the power state transition comprises controlling the power state transition without requesting additional authentication data from a user of the apparatus when the authentication data is determined to be valid.

13. The method of claim 10, wherein the application is a video application, and
wherein the executing of the application comprises reproducing the video according to the application data.

14. The method of claim 10,
wherein the request to the other NFC device further includes a request to perform at least one of transitioning to the sleep state, and remaining in a current operation state.

15. The method of claim 10, further comprising:
after transitioning to the wake state, transmitting, to the other NFC device, a signal for controlling an operation of the other NFC device.

16. The method of claim 10, wherein the generating of the trigger signal comprises generating the trigger signal based on a current or voltage differential created by the presence of the other NFC device, without otherwise supplying power to an NFC transceiver of the apparatus.

17. An apparatus, comprising:
a Near Field Communication (NFC) transceiver configured to generate a trigger signal in response to presence of another NFC device within an NFC communication range of the NFC transceiver and to receive application data from the other NFC device;
a Power Management Integrated Circuit (PMIC) configured to receive the trigger signal and to generate an interrupt signal for transitioning to or from a wake state; and
a controller configured to transition the apparatus to or from the wake state according to the interrupt generated by the PMIC and to control the apparatus to execute an application according to the application information received from the other NFC device,
wherein, when the application data is received from the other NFC device, the controller controls the NFC transceiver to transmit, to the other NFC device, a request for the other NFC device to stop executing a corresponding application.

* * * * *